(12) United States Patent
Hibino et al.

(10) Patent No.: US 8,919,173 B2
(45) Date of Patent: Dec. 30, 2014

(54) COMPOSITE HOSE WITH A CORRUGATED METAL TUBE AND METHOD FOR MAKING THE SAME

(75) Inventors: Motoshige Hibino, Komaki (JP); Yuji Takagi, Komaki (JP); Minoru Hiramatsu, Kasugai (JP); Koji Uchino, Kasugai (JP)

(73) Assignee: Sumitomo Riko Company Limited, Komaki-Shi (JP)

( * ) Notice: Subject to any disclaimer, the term of this patent is extended or adjusted under 35 U.S.C. 154(b) by 320 days.

(21) Appl. No.: 13/238,600

(22) Filed: Sep. 21, 2011

(65) Prior Publication Data

US 2012/0240404 A1    Sep. 27, 2012

Related U.S. Application Data

(60) Division of application No. 11/868,728, filed on Oct. 8, 2007, now abandoned, which is a continuation-in-part of application No. 11/091,732, filed on Mar. 28, 2005, now abandoned.

(51) Int. Cl.
*B21D 15/03* (2006.01)
*F16L 11/112* (2006.01)
*F16L 11/15* (2006.01)

(52) U.S. Cl.
CPC ............... *F16L 11/112* (2013.01); *F16L 11/15* (2013.01)
USPC .......................................... 72/370.19; 72/59

(58) Field of Classification Search
USPC ......... 72/370.19, 453.01, 453.11, 453.12, 54, 72/55, 57–62, 706; 29/421.1, 421.2, 505, 29/507, 509, 522.1, 523; 138/173, 121, 138/122
See application file for complete search history.

(56) References Cited

U.S. PATENT DOCUMENTS

| 3,561,492 | A |   | 2/1971  | Kauder et al. |
| 3,872,893 | A | * | 3/1975  | Roberts ......................... 138/121 |
| 4,147,185 | A |   | 4/1979  | Hines |
| 4,953,632 | A |   | 9/1990  | Sakaya et al. |
| 4,976,289 | A |   | 12/1990 | Umemori et al. |

(Continued)

FOREIGN PATENT DOCUMENTS

| DE | 199 21 724 C1 | 5/2001 |
| DE | 102 44 107 B4 | 4/2004 |

(Continued)

OTHER PUBLICATIONS

English Translation of the Claim of Japanese Patent Application Publication No. 57-86688.

(Continued)

*Primary Examiner* — Shelley Self
*Assistant Examiner* — Pradeep C Battula
(74) *Attorney, Agent, or Firm* — Andrus Intellectual Property Law, LLP

(57) ABSTRACT

A composite hose is constructed to have an outer peripheral portion and an inner peripheral portion. The outer peripheral portion includes an elastic layer and a reinforcing layer provided on an outer periphery of the elastic layer. The inner peripheral portion includes a corrugated metal tube which is provided with a corrugated portion formed with corrugation hills and corrugation valleys. A distance between the reinforcing layer and tops of the corrugation hills of the corrugated metal tube is designed 0.27 mm or less.

7 Claims, 9 Drawing Sheets

(56) References Cited

U.S. PATENT DOCUMENTS

| | | | |
|---|---|---|---|
| 5,096,234 A * | 3/1992 | Oetiker | 29/507 |
| 5,127,157 A * | 7/1992 | Oetiker | 29/507 |
| 5,413,147 A | 5/1995 | Moreiras et al. | |
| 5,720,504 A * | 2/1998 | Stedman et al. | 138/121 |
| 5,829,483 A * | 11/1998 | Tukahara et al. | 138/148 |
| 6,354,332 B1 | 3/2002 | Burkhardt et al. | |
| 6,761,188 B1 | 7/2004 | Besche et al. | |
| 6,866,302 B2 | 3/2005 | Furata | |
| 7,017,949 B2 * | 3/2006 | Luft et al. | 29/890.14 |
| 7,069,954 B2 | 7/2006 | Takagi et al. | |
| 7,086,419 B2 | 8/2006 | Takagi et al. | |
| 7,104,285 B2 | 9/2006 | Furuta | |
| 2002/0006491 A1 * | 1/2002 | Ito et al. | 138/137 |
| 2002/0117226 A1 | 8/2002 | Malcarne, Jr. | |
| 2003/0066568 A1 | 4/2003 | Hibino et al. | |
| 2004/0020545 A1 | 2/2004 | Takagi et al. | |
| 2004/0020546 A1 | 2/2004 | Furuta | |
| 2004/0090065 A1 | 5/2004 | Furuta et al. | |
| 2004/0112454 A1 | 6/2004 | Takagi | |
| 2004/0118470 A1 | 6/2004 | Furuta | |
| 2005/0229990 A1 | 10/2005 | Hilgert | |

FOREIGN PATENT DOCUMENTS

| | | |
|---|---|---|
| EP | 1 039 199 A2 | 9/2000 |
| EP | 1 162 397 A2 | 12/2001 |
| JP | 57-86688 A | 5/1982 |
| JP | 56-153089 | 4/1983 |
| JP | 58-56278 U | 4/1983 |
| JP | 02-268182 | 5/1992 |
| JP | 04-145285 A | 5/1992 |
| JP | 05277599 | 10/1993 |
| JP | 11-159616 A | 6/1999 |
| JP | 2000-025121 A | 1/2000 |
| JP | 10-332384 | 6/2000 |
| JP | 2000-161541 A | 6/2000 |
| JP | 2001159478 | 6/2001 |
| JP | 2001-182872 A | 7/2001 |
| JP | 2001-089090 | 10/2002 |
| JP | 2002-286175 A | 10/2002 |
| JP | 201-312845 | 4/2003 |
| JP | 2001-287414 | 4/2003 |
| JP | 2003 096839 A | 4/2003 |
| JP | 2003-117998 A | 4/2003 |

OTHER PUBLICATIONS

English Translation of the Abstract of Japanese Patent Application Publication No. 56-153089, first published as JPU 58-56278.

Patent Abstract of Japan for and English Translation of Abstract of Japanese Patent Application Publication No. 04145285.

Patent Abstract of Japan for and English Translation of Abstract, Claims and Specification of Japanese Patent Application Publication No. 11-159616.

Patent Abstract of Japan for and English Translation of Abstract, Claims and Specification of Japanese Patent Application Publication No. 2000-025121.

Patent Abstract of Japan for and English Translation of Abstract, Claims and Specification of Japanese Patent Application Publication No. 2000-161541.

Patent Abstract of Japan for and English Translation of Abstract, Claims and Specification of Japanese Patent Application Publication No. 2001-182872.

Patent Abstract of Japan for and English Translation of Abstract, Claims and Specification of Japanese Patent Application Publication No. 2002-286175.

Patent Abstract of Japan for and English Translation of Abstract, Claims and Specification of Japanese Patent Application Publication No. 2003 096839.

Patent Abstract of Japan for and English Translation of Abstract, Claims and Specification of Japanese Patent Application Publication No. 2003-117998.

English Language Abstract of Corresponding U.S. Patent Application No. 6,761,188 of German Patent Application Publication No. 199 21 724.

English Language Abstract of Corresponding European Patent Application No. 1398554 of German Patent Application Publication No, 102 44 107.

German Office Action dated Nov. 16, 2005 and English Translation for German Patent Application No. G0457DE corresponding to the present application's parent application (U.S. Appl. No. 11/091,732).

Notification of Reasons for Refusal dated Feb. 20, 2007 with English translation.

* cited by examiner

COMPOSITE HOSE WITH A CORRUGATED METAL TUBE AND METHOD FOR MAKING THE SAME

CROSS-REFERENCE TO RELATED APPLICATIONS

The present application is a divisional of co-pending U.S. patent application Ser. No. 11/868,728, filed Oct. 8, 2007, which application is incorporated herein by reference, which application is a continuation-in-part of U.S. patent application Ser. No. 11/091,732, filed Mar. 28, 2005, now abandoned.

TECHNICAL FIELD

The present invention relates to a composite hose with a corrugated metal tube which is adapted for plumbing in automobiles or the like, and a method for making such a composite hose.

BACKGROUND OF THE INVENTION

Typical rubber hoses, for example, made of a blend of acrylonitrile-butadiene rubber and polyvinyl chloride (NBR/PVC blend) or fluoro rubber (FKM) which is excellent in resistance to gasoline permeability, have been used for conveying fuel (fuel such as gasoline for engine) for automobiles or the like in view of their high vibration-absorbability, easy assembling or the like. However, for the purpose of global environment protection, the regulations have been recently tighten against permeation of fuel for automobiles or the like, and are anticipated to be further tighten in the future.

Therefore, such hoses for conveying fuel or the like are required further permeation resistance.

And, hoses for conveying fluid such as hydrogen gas used in fuel cells, or for conveying carbon dioxide gas refrigerant are required extremely high permeation resistance to such conveyed fluid as hydrogen gas, carbon dioxide gas.

However, with regard to this requirement hoses configured by organic materials only such as rubber or resin are difficult to satisfy such required resistance.

Under the circumstances, it is considered to form a composite hose by combining with a corrugated metal tube as a barrier layer against permeation of conveyed fluid.

For example, U.S. Pat. No. 6,354,332 and JP, A, 2001-182872 disclose a composite hose with a corrugated metal tube of this type. Here, a corrugated metal tube and an elastic layer such as rubber layer are combined, and a reinforcing layer is provided on the elastic layer to construct a composite hose which has permeation resistance and pressure resistance as well as vibration damping property and mountability or assemblability. The reinforcing layer is usually constructed by winding or braiding a reinforcing wire or reinforcing thread around an outer periphery of the elastic layer or by overlaying a layer braided with a reinforcing wire or reinforcing thread around the outer periphery of the elastic layer. In many cases, a layer having elasticity such as a rubber layer is formed on an outer side of thus constructed reinforcing layer.

By the way, in case where an elastic layer, for example, made of rubber, is provided on an outer periphery of the corrugated metal tube, a rubber material is, for example, extruded or overlaid therearound. Here, the rubber material is required to have a proper thickness in order to secure a stable and axially continuous processability. Therefore, as the elastic layer of a certain thickness is interposed between the corrugated metal tube and the reinforcing layer even on positions of the corrugation hills of the corrugated metal tube, as a result, a certain distance is defined between the corrugation hills and the reinforcing layer. Also, when processing continuously in an axial direction, sometimes uneven thickness is caused in the elastic layer or uneven tension is caused in the reinforcing layer, and thereby the reinforcing layer has a slight slackness or looseness in a radial direction with respect to the corrugated metal tube. That is, in many cases, the reinforcing layer does not act a restraining force on the corrugated metal tube, for example, to restrain expansion of the corrugated metal tube once a high pressure is exerted to the corrugated metal tube by an internal fluid or at the same time when high pressure is exerted thereto by the internal fluid. So, for example, in such service environment or use environment that the corrugated metal tube is repeatedly subject to a stress beyond a fatigue-limit of the corrugated metal tube, if thus constructed composite hose with a corrugated metal tube is used, the corrugated metal tube is possibly fatigue broken. That is, thus composite hose with a corrugated metal tube cannot secure a reliable pressure resistance to the internal fluid. Inconvenience such as insufficient pressure-resistance in the composite hose with a corrugated metal tube is also caused in case where a rubber material is not filled in corrugation valleys of the corrugated metal tube and thereby gaps are defined between the corrugation valleys and the reinforcing layer.

As for technique to enhance durability of a corrugated metal tube, the techniques as disclosed in JP, A, 57-86688 (1982-86688) and JP, A, 11-159616 (1999-159616) are known. JP, A, 57-86688 disclosed that a metal bellows is exerted by an internal pressure, and it is stretched to extend a corrugation pitch in an axial direction, and the durability is enhanced by work hardening in this process. However, this necessarily results in different axial length, for example, largely different axial length among the corrugated metal tubes. On the other hand, JP, A, 11-159616 discloses that a sectional shape of a corrugated portion of a corrugated metal tube is changed from a U-shape to a S-shape, and this specific shape effectively enhances the durability. It is difficult to immediately employ both of the techniques.

The present invention is made under the foregoing circumstances. It is an object of the present invention to provide a composite hose with a corrugated metal tube which has an excellent pressure resistance to an internal fluid as well as vibration damping property and mountability, and consequently may increase service life of the composite hose, and to provide a method for making thus constructed composite hose with a corrugated metal tube. And it is an object of one aspect of the present invention to provide the composite hose with a corrugated metal tube wherein durability is improved both against repeated internal pressures and repeated bending deformations.

SUMMARY OF THE INVENTION

In order to achieve foregoing object of the present invention, there is provided a novel composite hose with a corrugated metal tube. The composite hose comprises an outer peripheral portion which has flexibility and an inner peripheral portion which is provided in an inside or an inner periphery of the outer peripheral portion. The outer peripheral portion includes an elastic layer and a reinforcing layer which is provided on an outer periphery of the elastic layer. The inner peripheral portion includes a corrugated metal tube which is provided with a corrugated portion formed with corrugation hills and corrugation valleys and has fluid impermeability. In one aspect of the present invention, a distance between the reinforcing layer and tops of the corrugation hills of the corrugated metal tube is designed 0.27 mm or less. In case where the distance between the reinforcing layer and the corrugated metal tube, more specifically the distance between the reinforcing layer and tops of the corrugation hills of the corrugated metal tube is 0.27 mm or less, when an internal pressure is exerted to the corrugated metal tube, the reinforcing layer immediately restrains the corrugated metal tube from being deformed in an expanding manner. That is, there is not caused the following phenomena. The corrugation hills compress, push or extrude the elastic layer outwardly first, and after that the corrugated metal tube is restrained from expanding by the reinforcing layer. In order to make the distance between the reinforcing layer and the tops of the corrugation hills of the corrugated metal tube 0.27 mm or less, for example, it is advantageous to expand and plastically deform the corrugated metal tube in a state that the distance therebetween is about 0.3 mm. If the reinforcing layer has a slight slackness or looseness in a radial direction with respect to the corrugated metal tube, the slackness or looseness may be eliminated in this manner. Or, for example, the elastic layer is compressed. In case where the corrugated metal tube is deformed in an expanding manner prior to active use, the distance between the reinforcing layer and the tops of the corrugation hills of the corrugated metal tube becomes 0.27 mm or less at deformation in an expanding manner. Depending on circumstances, the distance between the reinforcing layer and the tops of the corrugation hills of the corrugated metal tube may be, for example, calculated by subtracting a radius of outer surface of the tops of the corrugation hills of the corrugated metal tube from a radius to a perimeter length of the reinforcing layer (perimeter length of an inside of the reinforcing layer).

In one aspect of the present invention, an elastic layer is filled in the corrugation valleys of the corrugated metal tube or in valley gaps between corrugation hills of the corrugated metal tube, for example, to the tops of the corrugation hills or completely. And, the corrugation hills are designed larger or substantially larger in width (or curvature radius) than the corrugation valleys of the corrugated metal tube. For example, width (or curvature radius) of the corrugation hills may be designed equal to or more than 1.5 times of width (or curvature radius) of corrugation valleys. Such construction of the corrugated metal tube may be obtained by disposing the elastic layer with a proper thickness on an outer periphery of the corrugated metal tube which includes the corrugation hills and the corrugation valleys having the same width (or curvature radius) or generally the same width (or curvature radius) so as to be filled in the corrugation valleys, providing the reinforcing layer on an outer periphery of the elastic layer, and exerting to an inside of the corrugated metal tube such amount of deforming pressure as to plastically deform the corrugated metal tube outwardly (prepressurizing process). The deforming pressure has such amount as to plastically deform the corrugated metal tube outwardly, for example, until the slackness or looseness is eliminated in the reinforcing layer with respect to the elastic layer. Here, even if the elastic layer is not filled in the corrugation valleys, as the corrugation valleys are deformed so as to enclose the elastic layer therein, the elastic layer finally intrudes in the corrugation valleys without leaving space.

By the way, after the inventors precisely investigated fatigue crack of the corrugated metal tube, it is found out that repeated internal pressures tend to cause a crack on the tops of the corrugation hills resulting in a fatigue crack of the corrugated metal tube, while repeated bending deformations based on flexibility of the corrugated metal tube tends to cause a crack in bottoms of the corrugation valleys resulting in a fatigue crack of the corrugated metal tube.

And, it is found out in the subsequent research that when the prepressurizing process is applied to a composite hose before active use as stated above, durability against repeated internal pressures is improved, but on the other hand, there is a fact that durability against repeated bendings is lowered after all. In some cases, lowered durability against repeated bendings causes inconvenience.

In pursuit of the cause, it is found out that lowered durability against such repeated bending deformations is caused due to that the corrugation valleys change a shape thereof so that the curvature radius R of the corrugation valleys changes smaller than original or initial curvature radius R thereof as a result of the prepressurizing process.

The prepressurizing process prior to active use improves durability against repeated internal pressures as follows. For example, the elastic layer or the rubber filler layer which penetrates in valley gaps is pushed or extruded in an outer peripheral side as the corrugation hills are deformed in an expanding manner, thereby the reinforcing layer comes into more tensioned state than initial state, and slackness or looseness of a reinforcing wire member or filament member which the reinforcing layer initially has is eliminated. This makes the reinforcing layer to produce a reinforcing effect on the corrugated metal tube once an internal pressure is exerted. However, as a result, the curvature radius of the corrugation valleys becomes small, and when the corrugated metal tube is deformed in a bending manner repeatedly, a large stress is caused in bottoms of the corrugation valleys, and thereby a crack tends to occur in the bottoms of the corrugation valleys. This is found out to bring about a lowered durability against repeated bending deformations.

In the corrugated metal tube, an internal pressure causes a maximum stress on the tops of the corrugation hills, while bending deformation causes a maximum stress in the bottoms of the corrugation valleys. So, it is an essential in improvement of durability against repeated internal pressures and repeated bending deformations to restrain these fatigue cracks on the tops of the corrugation hills and in the bottoms of the corrugation valleys.

In one aspect of the present invention, there is provided a composite hose with a corrugated metal tube having an overall excellent durability by enhancing the durability against repeated bending deformations as well as the durability against repeated internal pressures. The composite hose also comprises an outer peripheral portion which has flexibility and an inner peripheral portion which is provided in an inside of or an inner periphery of the outer peripheral portion. The outer peripheral portion includes an elastic layer (elastic filler layer), and a reinforcing layer which is provided on an outer periphery of the elastic layer, for example, by braiding a reinforcing wire member or filament member. And, the inner peripheral portion includes the corrugated metal tube which has a corrugated portion formed with corrugation hills and corrugation valleys and has fluid impermeability.

The corrugated metal tube constitutes a barrier layer against permeation of conveyed fluid. And, the valley gaps between the corrugation hills of the corrugated metal tube are filled in with the elastic layer, for example, completely.

In this composite hose, prior to active use or service, prepressurizing process is applied to the corrugated metal tube or to the composite hose so that the corrugated metal tube is expanded and plastically deformed by exerting deforming pressure (internal pressure), for example, higher than a pressure (internal pressure) to be exerted by an internal fluid in a use or service environment (during activate use), for example, in order to make the reinforcing layer in a tensioned state. The corrugation hills in the corrugated metal tube are designed to have smaller curvature radius than a curvature radius of the corrugation valleys before prepressurized or the prepressurizing process is applied. For example, the curvature radius of the corrugation hills is designed equal to or less than two-thirds of the curvature radius of the corrugation valleys, more preferably, equal to or less than one-third thereof.

In the corrugated metal tube which is previously adapted for plumbing, the corrugation hills and corrugation valleys have the same shape initially, for example, when manufactured. On the contrary, in one aspect of the present invention, the corrugation hills are formed to have a curvature radius smaller than the curvature radius of the corrugation valleys when manufactured, more specifically before the prepressurizing process is applied. In this construction, when the corrugation hills are deformed in an expanding manner by applying the prepressurizing process to a composite hose with a corrugated metal tube later, for example, the curvature radius of the corrugation hills comes close to, equal to, or generally equal to the curvature radius of the corrugation valleys, that is, the corrugation hills come similar to the corrugation valleys in shape. Therefore, durability may be effectively enhanced against repeated bending deformations as well as against repeated internal pressures.

And, in other words, the corrugation valleys have the curvature radius larger than the curvature radius of corrugation hills when manufactured. This improves penetration or insertability of the elastic filler layer in the valley gaps and enables the elastic filler layer to be surely filled in the valley gaps without leaving space. Thereby may be obtained effects of more improving and stabilizing quality of products.

In the present invention, this shape of corrugation hills and corrugation valleys includes a shape which can be described substantially as circular arc as well as accurate circular arc. That is, corrugation hills and corrugation valleys may be shaped substantially in a circular arc or generally in a circular arc.

As already stated, in the present invention, the curvature radius of the corrugation hills is preferably designed equal to or less than two-thirds of the curvature radius of the corrugation valleys, more preferably equal to or less than one-third thereof.

This shape allows the curvature radius of the corrugation hills closer to the curvature radius of the corrugation valleys when applying thereto such high pressure as to plastically deform the corrugation hills of the corrugated metal tube in the pressurizing process later.

Also, according to the present invention, there is provided a new method for making a composite hose which has a corrugated metal tube in an inner peripheral portion. The method for making a composite hose comprises a first step of preparing a corrugated metal tube which includes a corrugated portion formed with corrugation hills and corrugation valleys, a second step of constructing an outer peripheral portion with flexibility on an outer periphery of the corrugated metal tube by forming an elastic layer on an outer periphery of the corrugated metal tube and providing a reinforcing layer on an outer periphery of the elastic layer, and a third step of plastically deforming the corrugated metal tube outwardly by exerting in an inside or the inner peripheral portion of the corrugated metal tube a deforming pressure beyond or exceeding a yield point of the corrugated metal tube. In the composite hose with a corrugated metal tube which is made or manufactured in this manner, even if the corrugated metal tube is subject to a pressure beyond a deforming pressure by an internal fluid in a use or service to environment, restraining force of the reinforcing layer is immediately exerted to the corrugated metal tube, and thereby a fatigue crack is hardly caused. However, here, it is feared that the corrugated metal tube compresses the elastic layer and is slightly expanded. So, in order to obtain more reliable restraining effect from the reinforcing layer, deforming pressure to be exerted to an inside of the corrugated metal tube is preferably set higher than a pressure to be exerted by an internal fluid in a use or service environment.

The present invention relates, for example, to a composite hose with a corrugated metal tube as a barrier layer against permeation of conveyed fluid, which is preferably usable for conveying fuel in automobiles, conveying refrigerant, conveying fuel of cell such as hydrogen gas used in a fuel cell or other applications. And, a corrugated shape or a performance based on the shape provides a corrugated metal tube with an effect of flexibility. A material of the corrugated metal tube itself is a metal and does not have elasticity different from rubber or the like. So, such composite hose with a corrugated metal tube involves a problem that the composite hose with a corrugated metal tube is deformed repeatedly during active use resulting that the corrugated metal tube is readily fatigue-broken.

In the composite hose according to the present invention or the composite hose made in the method according to the present invention, there occurs no damage such as bursting even if used for a long term in the environment where high pressure is exerted repeatedly by an internal fluid. Further, the method for making a composite hose according to the present invention provides an advantage to reduce nonuniformity of durability of the composite hoses as restraining functions are kept uniform when the corrugated metal tubes are plastically deformed even if the reinforcing layers have nonuniform restraining functions.

According to one aspect of the present invention, in the corrugated metal tube, the corrugation hills or tops (top portions) of the corrugation hills have Vickers hardness that is greater than Vickers hardness of the corrugation valleys or bottoms (bottom portions) of the corrugation valleys, for example, 5% or more. And, the corrugated metal tube is made of SUS304, and the corrugated metal tube has Vickers hardness that is equal to or greater than Hv170 at positions of the tops (at the tops or the top portions) of the corrugation hills.

According to one aspect of the present invention, the prepressurizing process is applied to the corrugated metal tube in such a manner that a pressure is raised in an inside of the corrugated metal tube at a constant pressure raising speed up to a determined pressure that is greater than a yield point of the corrugated metal tube, and the inside of the corrugated metal tube is maintained at the determined pressure that is greater than the yield point during a determined duration time period. And, the pressure is applied so that the corrugation hills or the tops (top portions) of the corrugation hills have Vickers hardness that is greater than Vickers hardness of the corrugation valleys or the bottoms (bottom portions) of the corrugation valleys, for example, by 5% or more. The corrugated metal tube is made of SUS304, and the pressure is applied so that the corrugated metal tube has Vickers hardness that is equal to or greater than Hv170 at positions of the tops of the corrugation hills.

Now, the preferred embodiments of the present invention will be described in detail with reference to the drawings.

DETAILED DESCRIPTIONS OF PREFERRED EMBODIMENTS

Figure 1:
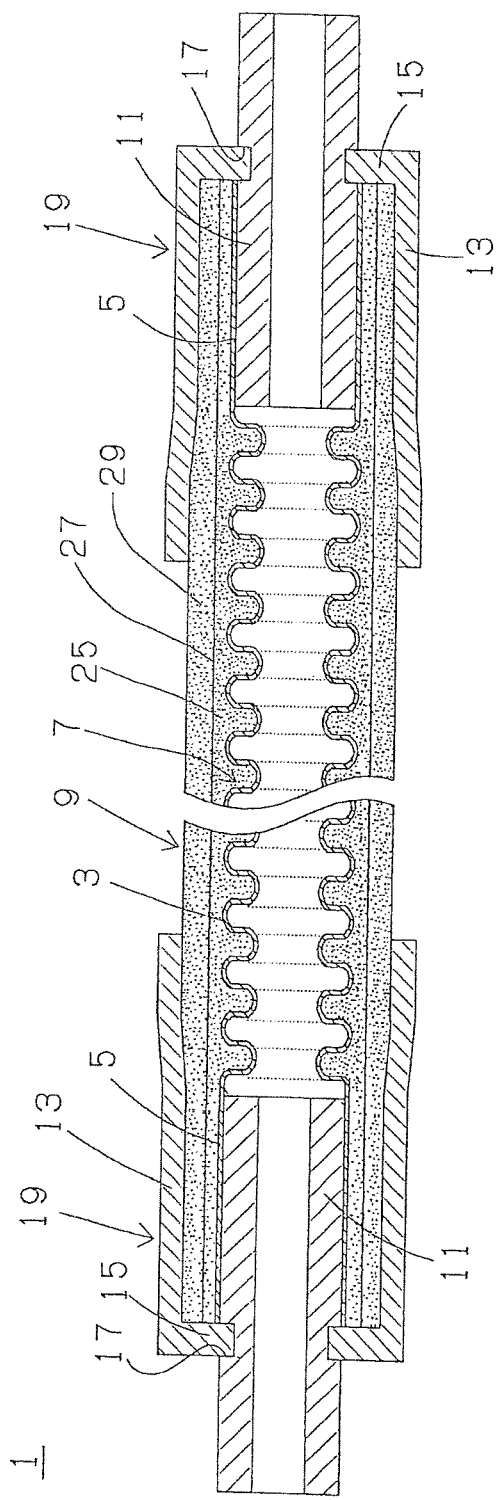
FIG. 1 is a sectional view of a first composite hose with a corrugated metal tube (wherein the corrugated metal tube is not plastically deformed yet) according to the present invention.

FIG. 1 shows a first composite hose with a corrugated metal tube (wherein a corrugate metal tube is not plastically deformed yet) according to the present invention. A first composite hose with a corrugated metal tube 1 (hereinafter referred to just as a first hose 1) comprises a corrugated metal tube 7 as an inner peripheral portion, an outer peripheral portion 9 which is provided on an outer side of the corrugated metal tube 7, a metal insert fitting 11 which is shaped a pipe. The corrugated metal tube 7 integrally has a corrugated portion 3 which is formed with corrugation hills and corrugation valleys and straight-wall portions 5, 5 which are formed on opposite ends of the corrugated portion 3. The insert fitting 11 is inserted in each of the straight-wall portions 5, 5 of the corrugated metal tube 7. The first hose 1 further comprises sleeve-like socket fittings 19, 19. Each socket fitting 19 integrally has a tubular portion 13 and an inwardly-directed flange 15 which is formed on an end portion of the tubular portion 13. The socket fitting 19 is disposed such that the inwardly-directed flange 15 is fitted in an annular groove 17 which is formed on an outer periphery of the insert fitting 11, and the tubular portion 13 is securely compressed and fitted on an end portion of the outer peripheral portion 9. For example, one insert fitting 11 is connected to one fuel system member (not shown) while the other insert fitting 11 is connected to the other fuel system member (not shown), and thereby the first hose 1 is used as a fuel piping system. The corrugated metal tube 7 and the outer peripheral portion 9 construct a hose body, and the insert fitting 11 and the socket fitting 19 construct a joint fitting.

Figure 2:
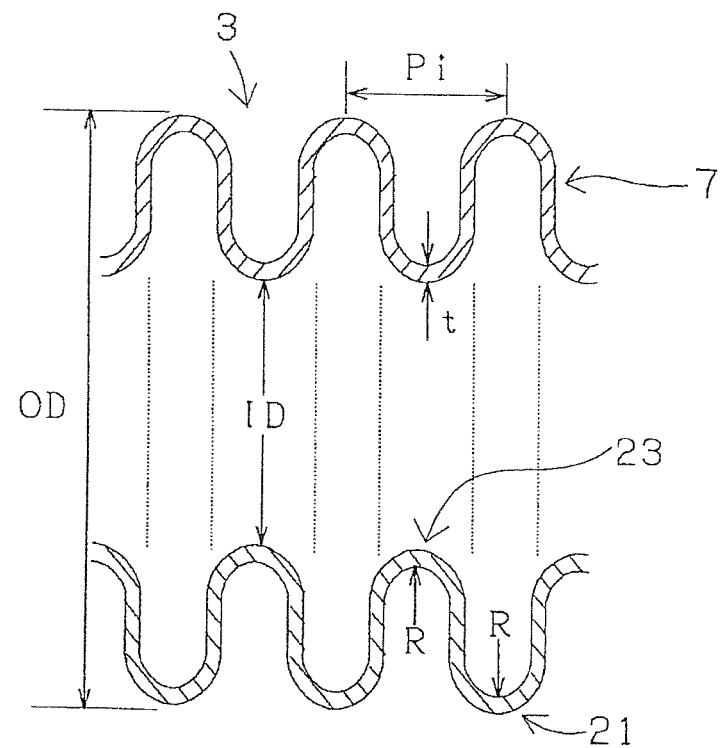
FIG. 2 is an enlarged sectional view of a corrugated portion of the corrugated metal tube of the first composite hose.

The corrugated metal tube 7 is produced in the following manner. A strip or an elongate material made of SUS304 with 0.23 mm in thickness and 25 mm in width is formed into a simple round shape and mating edges of the strip are welding by TIG (tungsten inert gas) welding to form a thin-walled tube of simple cylindrical shape. Then, the thin-walled tube is processed by drawing or deep-drawing onto an outer peripheral side thereof, and followed by a bright-anneal process at 1100° C. in an anoxic atmosphere to eliminate process-induced strain (a first step). In the corrugated metal tube 7, each straight-wall portion 5 has a length of 20 mm, and the corrugated portion 3 has a length of 430 mm. With reference to FIG. 2, the corrugated portion 3 of the corrugated metal tube 7 has an outer diameter OD of 9.45 mm (same as an outer diameter of the straight-wall portion 5), an inner diameter ID of 4.25 mm, a corrugation pitch Pi of 2.0 mm and a wall thickness t of 0.23 mm (same as a wall thickness of the straight-wall portion 5). In the corrugated portion 3, corrugation hills 21 and corrugation valleys 23 are formed in the same width or in generally the same width. That is, with reference to FIG. 2, the curvature radius R of the corrugation hills 21 is equal to the curvature radius R of the corrugation valleys 23. As for materials for the corrugated metal tube 7, applicable are iron, iron steel, stainless steel or other alloy steel, aluminum or aluminum alloy, copper or copper alloy, nickel or nickel alloy, titanium or titanium alloy, tin or tin alloy, or the like.

Figure 3:
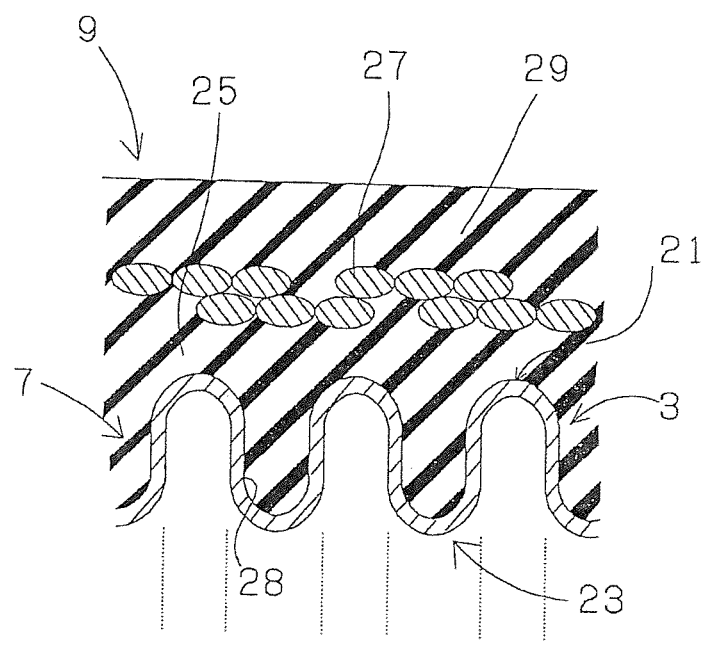
FIG. 3 is an enlarged sectional view of an outer peripheral portion of the first composite hose.

With reference to FIG. 3, the outer peripheral portion 9 which is provided on an outer side of the corrugated metal tube 7 has an inner rubber layer (rubber filler layer) 25 which covers an outer periphery of the corrugated metal tube 7, a reinforcing layer 27 which is provided on an outer periphery of the inner rubber layer 25, and an outer rubber layer (cover rubber layer) 29 with a thickness, for example, of 1.5 mm which covers on an outer periphery of the reinforcing layer 27. The inner rubber layer 25 has a thickness, for example, of about 0.3 mm (300 μm) at positions of tops of the corrugation hills 21, and is made of ethylene propylene diene rubber (EPDM). However, a variety of rubbers such as silicon rubber, butyl rubber and acrylic rubber may be adapted for the inner rubber layer 25. The inner rubber layer 25 also may be made of a solid rubber which is a nonfoamed material. Rubber material for the inner rubber layer 25 preferably has a low viscosity so as to be filled in and penetrate in the corrugation valleys 23 of the corrugated metal tube 7 in the unvulcanized state. The outer rubber layer 29 is also made of EPDM. However, a variety of rubbers such as silicon rubber, butyl rubber and acrylic rubber may be adapted also for the outer rubber layer 29. Rubber material for the outer rubber layer 29 preferably has an excellent whether resistance. The reinforcing layer 27 is formed by braiding aramid threads. However, a wire (for example, a metal wire) or a polyethylene terephthalate (PET) thread or the like may be adapted for the reinforcing layer 27.

The outer peripheral portion 9 of such construction is formed in the following manner. First, unvulcanized EPDM for the inner rubber layer 25 is laminated on the outer periphery of the corrugated metal tube 7 by extrusion, and the reinforcing layer 27 is formed by aramid threads on the outer periphery of the unvulcanized EPDM. Then, unvulcanized EPDM for the outer rubber layer 29 is laminated further on the outer periphery of the reinforcing layer 27 formed from the aramid threads. After that, the EPDM of the inner rubber layer 25 and the outer rubber layer 29 are vulcanized at 160° C. for 30 minutes. The EPDM for the inner rubber layer 25 may be laminated on the corrugated metal tube 7 by injection molding or the like. The inner rubber layer 25 is a layer which penetrates in gaps or valley gaps 28 between adjacent corrugation hills 21, 21 of the corrugated portion 3 on an outer peripheral side thereof in order to restrain the corrugated metal tube 7 from excessive deformation or the corrugation hills 21 from deformation in an is expanding manner when an internal pressure is exerted to the corrugated portion 3.

Then, as shown in FIG. 1, the insert fitting 11 is inserted in each of the straight-wall portions 5, 5 on opposite ends of the corrugated metal tube 7, and the socket fitting 19 is fitted on each of opposite ends of the outer peripheral portion 9. And, the tubular portion 13 of the socket fitting 19 is securely compressed onto the outer peripheral portion 9 such that the tubular portion 13 is securely fixed to the outer peripheral portion 9 at a position of the straight-wall portion 5 and the inwardly directed flange 15 is fitted in the annular groove 17 which is formed in the outer periphery of the insert fitting 11. Here, the straight-wall portion 5 is securely compressed so as to be pressed into contact with, to be pressed against or to contact closely with the insert fitting 11. In such manner, the first hose 1 (wherein the corrugated metal tube 7 is not plastically deformed yet) as a composite hose with a corrugated metal tube which is laminated with rubber elastic layer may be produced (second step). The first hose 1 includes a flexible portion between the tubular portions 13, 13 of the socket fittings 19, 19 which are located on opposite ends thereof. The flexible portion has a length of 400 mm. Meanwhile, the corrugated metal tube 7 and the inner rubber layer 25, the reinforcing layer 27 and the inner and outer rubber layers 25, 29 are preferably joined with adhesive respectively. Here, they are joined each other with adhesive component which is added in the EPDM as material for the inner and outer rubber layers 25, 29. However, separate adhesive may be adapted to join them each other.

Figure 4:
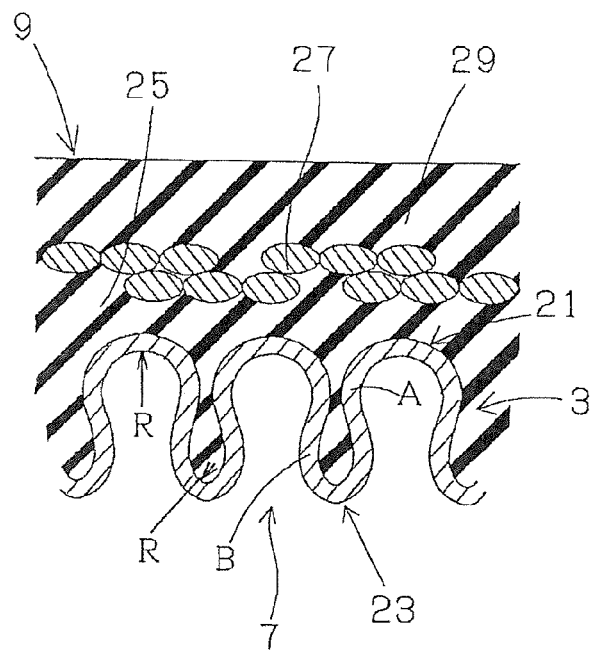
FIG. 4 is a sectional view showing a shape of the corrugated portion of the first composite hose which is plastically deformed by being prepressurized.

Then, the corrugated metal tube 7 is plastically deformed outwardly by applying a deforming pressure (prepressurizing) in an inside of the first hose 1 (wherein the corrugated metal tube 7 is not plastically deformed yet), and thereby the first hose 1 according to the present invention is constructed (third step). More specifically, one insert fitting 11 is closed with a plug, water, air or oil is supplied in the inside of the first hose 1 or the corrugated metal tube 7 through the other insert fitting 11, and a pressure is raised in the inside of the corrugated metal tube 7 at a determined pressure raising speed up to a determined pressure or determined pressure value. In the inside of the corrugated metal tube 7, once the pressure is reached the determined pressure value, the determined pressure state is maintained during the determined duration time period, then the pressure is reduced. Here, in case where the determined pressure value is equal to or lower than a breakdown point or yield point of the corrugated metal tube 7, when depressurized, the corrugated metal tube 7 returns to the previous state, namely what it is before the pressure is exerted. In case where the determined pressure value exceeds the yield point thereof, the corrugated portion 3 is plastically deformed by being prepressurized, tops of the corrugation hills 21 of the corrugated portion 3 are slightly raised radially outward, and a distance between the tops of the corrugation hills 21 and the reinforcing layer 27 is reduced. So, if slackness or looseness occurs in the reinforcing layer 27 with respect to the inner rubber layer 25, such slackness or looseness will be eliminated. And, for example, the inner rubber layer 25 is slightly compressed. In the first hose 1 according to the present invention, the distance between the tops of the corrugation hills 21 and the reinforcing layer 27 or a wall thickness or radial thickness of the inner rubber layer 25 between the tops of the corrugation hills 21 and the reinforcing layer 27 is eventually designed 0.27 mm or less. Here, as shown in FIG. 4, pre-pressurizing makes the corrugation hills 21 of the corrugated portion 3 to expand in a widthwise direction thereof (in an axial direction of the corrugated portion 3) and on the contrary, the corrugation valleys 23 to narrow in a widthwise direction thereof so as to enclose the inner rubber layer 25 in the corrugation valleys 23. With reference to FIG. 4, the curvature radius R of the corrugation hills 21 is larger than the curvature radius R of the corrugation valleys 23. The corrugation hills 21 have width substantially larger than that of the corrugation valleys 23. Also, the width (or the curvature radius) of corrugation hills 21 is about 1.5 times larger than that of corrugation valleys 23 at maximum width position (refer to maximum width position A of the corrugation hill 21 and maximum width position B of the corrugation valley 23). Then, for example, even if a slight gap is created between the corrugation valleys 23 and the inner rubber layer 25, it is closed when the corrugation valleys 23 are narrowed in width thereof.

Figure 5:
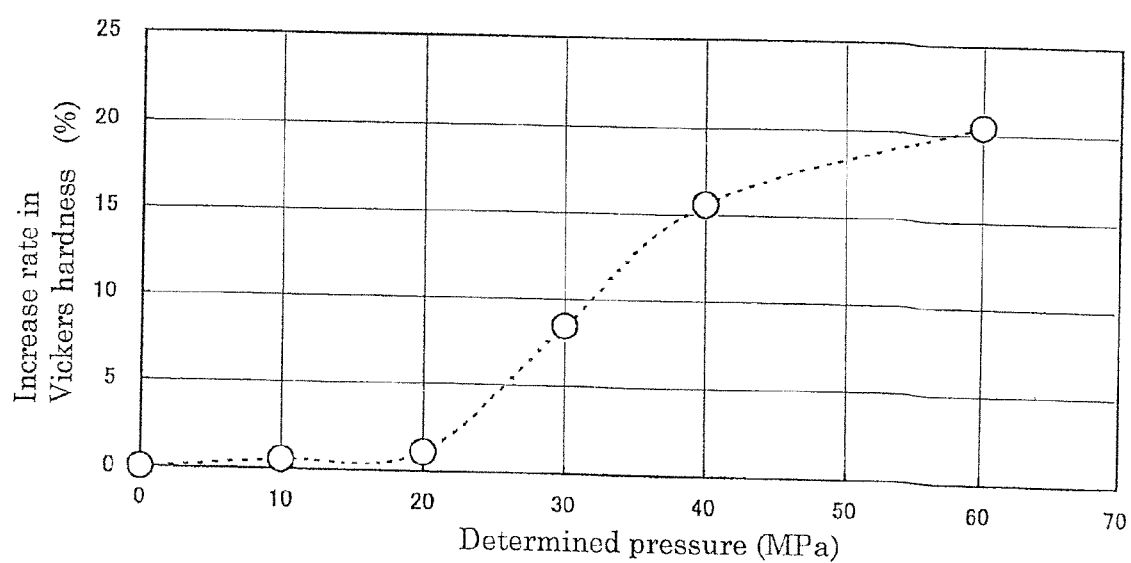
FIG. 5 is an explanatory view showing a relationship between prepressure value and Vickers hardness.
Figure 6:
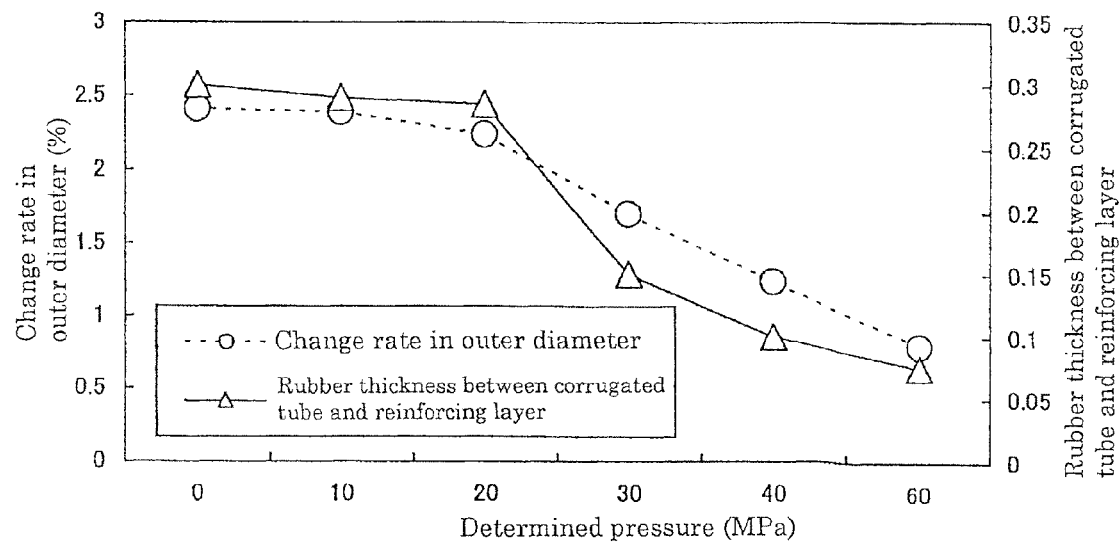
FIG. 6 is an explanatory view showing a relationship between prepressure value and change rate in outer diameter, and a relationship between the prepressure value and a distance between the corrugated metal tube and a reinforcing layer.

Samples of the first hose 1 are constructed (produced) by setting determined pressures or determined prepressures of 10 MPa, 20 MPa, 30 MPa, 40 MPa, and 60 MPa respectively. And another sample of the first hose 1 is also constructed by setting a determined prepressure of 0 MPa, namely without applying prepressure. For producing the samples, a determined pressure rising speed is set 10 MPa/minute and the determined duration time period is set 5 minutes. Increase rate in Vickers hardness (Increase percentage in Vickers hardness) of the tops of the corrugation hills 21 of the corrugated metal tubes 7 are shown with regard to each of the samples in FIG. 5. FIG. 6 shows the change rate of the outer diameter OD (change rate in outer diameter) of each corrugated metal tube 7 of the samples of the first hose 1 when each of the samples of the first hose 1 which is bent into a U-shape with a radius of 100 mm is attached to test equipment, and then an internal pressure of 20 MPa is exerted thereto repeatedly at 30 cpm (cycles per minute) by oil pressure at room temperature (impulse test, namely a test to obtain the number of impulse durability cycles or a durability test). And FIG. 6 also shows a distance or relationship between the reinforcing layer 27 and the tops of the corrugation hills 21 of the corrugated metal tube 7 (namely a distance or a rubber thickness between the corrugated metal tube 7 and the reinforcing layer 27) with respect to each sample, which varies depending on prepressure. Here, a section of the corrugated metal tube 7 and others before and after prepressurized, namely in case where pre-pressurizing process is applied and in case where the prepressurizing process is not applied, and the section of the corrugated metal tube 7 to which the impulse test is conducted are measured by observation and the results are recorded. A burst pressure of the corrugated metal tube 7 is set 80 MPa. The increase rate in Vickers hardness (%) is calculated as [{(Vickers hardness of the corrugated metal tube 7 of the first hose 1 which is prepressurized) minus (Vickers hardness of the corrugated metal tube 7 of the first hose 1 which is not prepressurized)} divided by (Vickers hardness of the corrugated metal tube 7 of the first hose 1 which is not prepressurized)] multiplied by 100. And, a change rate in an outer diameter (%) is calculated for each, with regard to the first hoses 1 which are prepressurized and the first hose 1 which is not prepressurized as [{(an outer diameter of the tops of the corrugation hills 21 of the corrugated metal tube 7 of the first hose 1 after the impulse test is conducted) minus (an outer diameter of the tops of the corrugation hills 21 of the corrugated metal tube 7 of the first hose 1 before the impulse test is conducted)} divided by (the outer diameter of the tops of the corrugation hills 21 of the corrugated metal tube 7 of the first hose 1 before the impulse test is conducted)] multiplied by 100. According to FIG. 5, in case where the determined pressure is 20 MPa or less, there is little change in Vickers hardness between the sample or the first hose 1 which is prepressurized and the sample or the first hose 1 which is not prepressurized. Therefore, it is understood that a stress beyond the yield point is not generated in the corrugated metal tube 7, that is, plastic deformation is not brought about in the corrugated metal tube 7 in case where the determined pressure is 20 MPa or less. However, it is found that when prepressurized at the determined pressure beyond 20 MPa, as Vickers hardness is increased, a stress beyond the yield point is generated in the corrugated metal tube 7, namely, plastic deformation is brought about in the corrugated metal tube 7. So, it is understood that a yield strength of the corrugated metal tube 7 is about 20 MPa. The corrugated metal tube 7 to which an internal pressure is exerted by prepressurization expands radially or axially, the reinforcing layer 27 is extended as the corrugated metal tube 7 expands and slackness or looseness in the reinforcing layer 27 is reduced, or the distance between the reinforcing layer 27 and the tops of the corrugation hills 21 of the corrugated metal tube 7 is reduced. Here, if plastic deformation is brought about in the corrugated metal tube 7, even when the sample of the first hose 1 is depressurized, the slackness or looseness in the reinforcing layer 27, or the distance between the reinforcing layer 27 and the tops of the corrugation hills 21 of the corrugated metal tube 7 is maintained in a reduced state. This is understood from FIG. 6. For example, when the sample of the first hose 1 is prepressurized at the determined pressure of 150% of the yield strength (for example, 30 MPa), or at the determined pressure equal to the sum of the yield strength and 10 MPa, for example, 30 MPa, the distance between the reinforcing layer 27 and the tops of the corrugation hills 21 of the corrugated metal tube 7 becomes 0.15 mm, and the change rate in an outer diameter of the corrugated metal tube 7 is only 1.7% in the impulse test. Further, when the sample of the first hose 1 is prepressurized at the determined pressures of 200% of the yield strength (for example, 40 MPa) or of 300% thereof (for example 60 MPa), or, at the determined pressures equal to the sum of the yield strength and 20 MPa or equal to the sum of the yield strength and 40 MPa, for example, 40 MPa or 60 MPa, the distance between the reinforcing layer 27 and the tops of the corrugation hills 21 of the corrugated metal tube 7 becomes 0.1 mm or 0.075 mm, and the change rate in outer diameter of the corrugated metal tubes 7 is only 1.2% or 0.8% in the impulse test. For example, pressure of 20 MPa is considered as a pressure to be exerted by an internal fluid in use or service environment. And, for example, when the pressure to be exerted by the internal fluid in use environment is 30 MPa, prepressure of 40 MPa or 60 MPa may be exerted.

Figure 7:
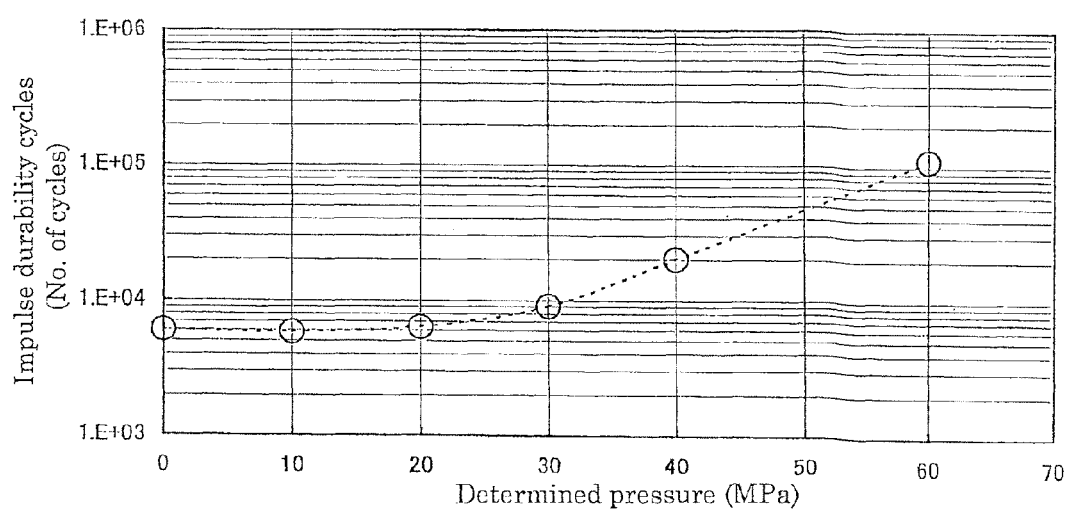
FIG. 7 is a view showing a relationship between prepressure value and durability under repeated pressures.

Samples of the first hose 1, which are constructed (produced) by setting determined prepressures of 0 MPa, 10 MPa, 20 MPa, 30 MPa, 40 MPa and 60 MPa, the determined pressure rising speed of 10 MPa/minute and the determined duration time period of 5 minutes, are bent into U-shape of R100 mm and attached to the test equipment for impulse test. Then, an internal pressure of 20 MPa is exerted to the samples repeatedly at 30 cpm by oil pressure at room temperature. The number of repetition cycles up to breakage of each sample of the first hoses 1 or corrugated metal tube 7 of each sample (the number of impulse durability cycles) is recorded and shown in FIG. 7. As understood from FIG. 7, when the determined prepressure is up to 20 MPa, there is almost no difference in the number of the repetition cycles up to breakage (about 6,000 cycles) between the samples which are prepressurized and the sample which is not prepressurized. So, when the determined prepressure is up to 20 MPa, there occurs no stress beyond the yield point in the corrugated metal tubes 7 of the samples, and it is understood that a pressure resistance is not improved in the first hose 1 in this case. On the other hand, when the determined pressure is higher than 20 MPa, there is found a difference in the number of the repetition cycles up to breakage in comparison with the sample which is not prepressurized. Accordingly, it is understood that pressure resistance is improved in the first hose 1 when there occurs stress beyond the yield point in the corrugated metal tubes 7 in the prepressurizing process. Meanwhile, when the determined prepressure is 20 MPa, the distance between the reinforcing layer 27 and the tops of the corrugation hills 21 of the corrugated metal tube 7, or a rubber wall thickness of the inner rubber layer 25 at position of the tops of the corrugation is hills 21 or between the reinforcing layer 27 and the tops of the corrugation hills 21 of the corrugated metal tube 7 is about 0.28 mm, while when the determined prepressure is higher than 20 MPa, the distance therebetween or the rubber wall thickness thereof is below 0.28 mm, namely 0.27 mm or less. In particular, when determined prepressure of 30 MPa or higher is set, the number of repetition cycles up to breakage is improved to 9,000 cycles (when prepressure of 30 MPa applied), 20,000 cycles (when prepressure of 40 MPa applied) and 110,000 cycles (when prepressure of 60 MPa applied).

When the determined prepressure exceeds the yield strength of the corrugated metal tube 7, with increase of the determined prepressure, increase rate in Vickers hardness and the number of impulse durability cycles increase, while the change rate in an outer diameter and the distance between the reinforcing layer 27 and the tops of the corrugation hills 21 of the corrugated metal tube 7 decrease. Therefore, if the determined prepressure to be applied to the first hose 1 or the corrugated metal tube 7 exceeds the yield strength, it is possible to ensure favorable resistance to an internal fluid. Additionally, when the determined pressure is set 150% of the yield strength or equal to a sum of the yield strength and 10 MPa, the increase rate in Vickers hardness and the number of impulse durability cycles begin to rise notably, while the change rate in an outer diameter and the distance between the reinforcing layer 27 and the tops of the corrugation hills 21 of the corrugated metal tube 7 begin to decrease notably. And, it is more effective to set the determined pressure of 200% or 300% of the yield strength, or, the determined pressure equal to a sum of the yield strength and 20 MPa or 40 MPa.

Figure 8:
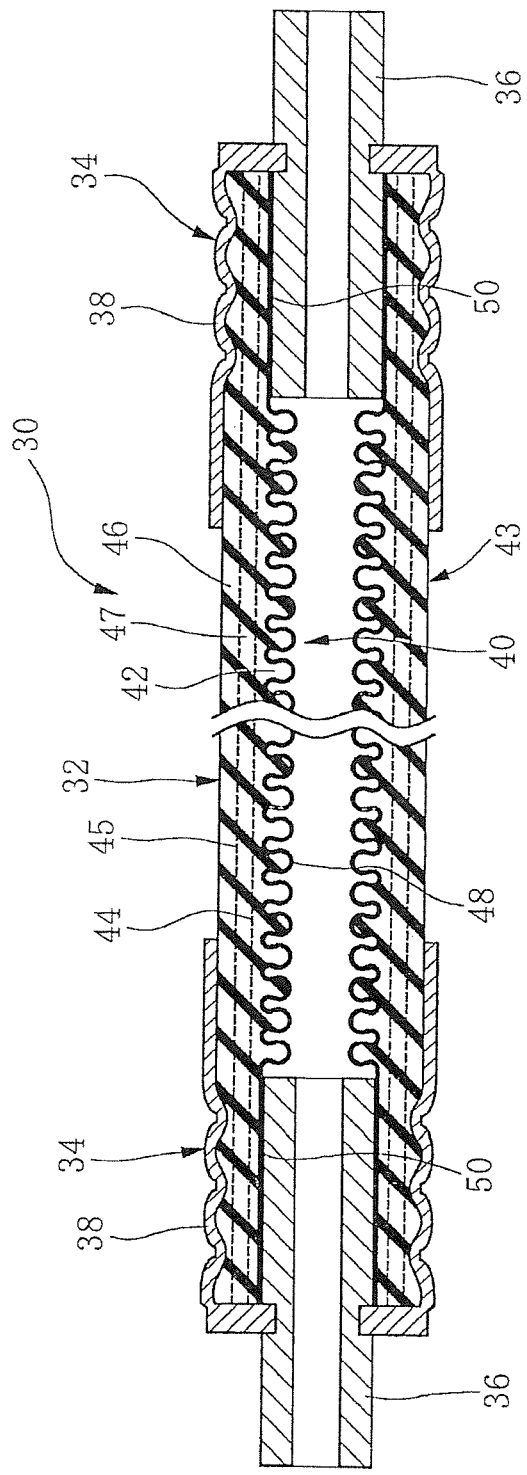
FIG. 8 is a sectional view of a second composite hose with a corrugated metal tube (wherein the corrugated metal tube is not plastically deformed yet) according to the present invention.

FIG. 8 shows a second composite hose with a corrugated metal tube (wherein a corrugated metal tube is not plastically deformed yet) according to the present invention. In FIG. 8, numeral reference 30 indicates the second composite hose with a corrugated metal tube (hereinafter referred to just as a second hose 30), numeral reference 32 a hose body, and numeral reference 34 a metal joint fitting attached on an end portion of the hose body 32. Construction of the second hose 30 may be understood better with reference to the first hose 1. And, construction of the first hose 1 may be also understood better with reference to the second hose 30.

The joint fitting 34 has a metal insert fitting 36 like a pipe and a metal socket fitting 38 like a sleeve. The insert fitting 36 and the socket fitting 38 are fixedly secured on the end portion of the hose body 32 by securely compressing the socket fitting 38 onto the hose body 32 in a radially contracting direction.

The second hose 30 has a corrugated metal tube 40 as an innermost layer. A radially outer side of the corrugated metal tube 40 is covered or laminated in sequence with a rubber filler layer 42 (inner rubber layer) as an elastic filler layer, a first reinforcing layer 44, a middle rubber layer 47, a second reinforcing layer 45, and an outer surface rubber layer 46 (cover rubber layer) as an outermost layer. The rubber filler layer 42, the first reinforcing layer 44, the middle rubber layer 47, the second reinforcing layer 45 and the outer surface rubber layer 46 construct an outer peripheral portion 43 which is provided on an outer side of the corrugated metal tube 40 as an inner peripheral portion.

Figure 9:
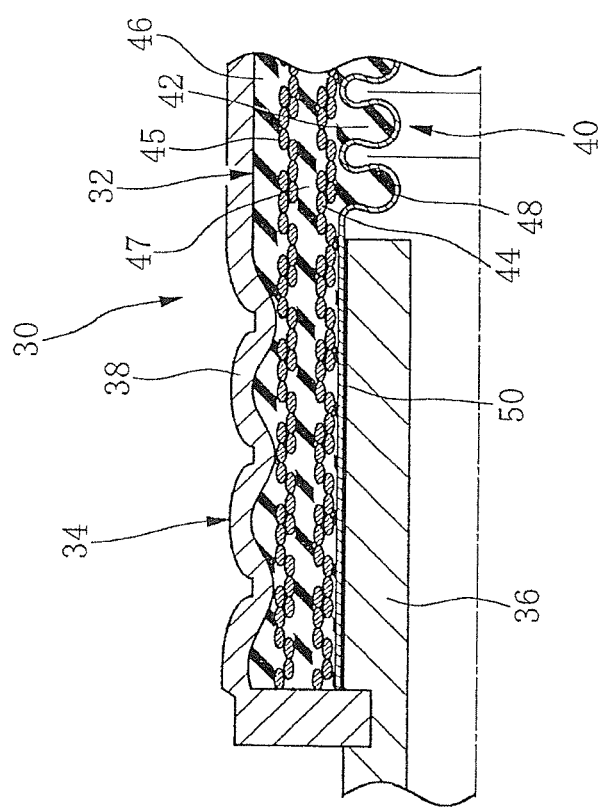
FIG. 9 is an enlarged sectional view of an end portion of the second composite hose with a corrugated metal tube.

As shown in FIG. 9, the corrugated metal tube 40 has a corrugated portion 48 and a straight-wall portion or straight-walled portion 50 of straight tubular shape on an end portion of the corrugated metal tube 40. The above insert fitting 36 is inserted inside the straight-wall portion 50.

The corrugated metal tube 40 of an innermost layer serves as a barrier layer against permeation of conveyed fluid, and is given flexibility by the corrugated portion 48.

Figure 10:
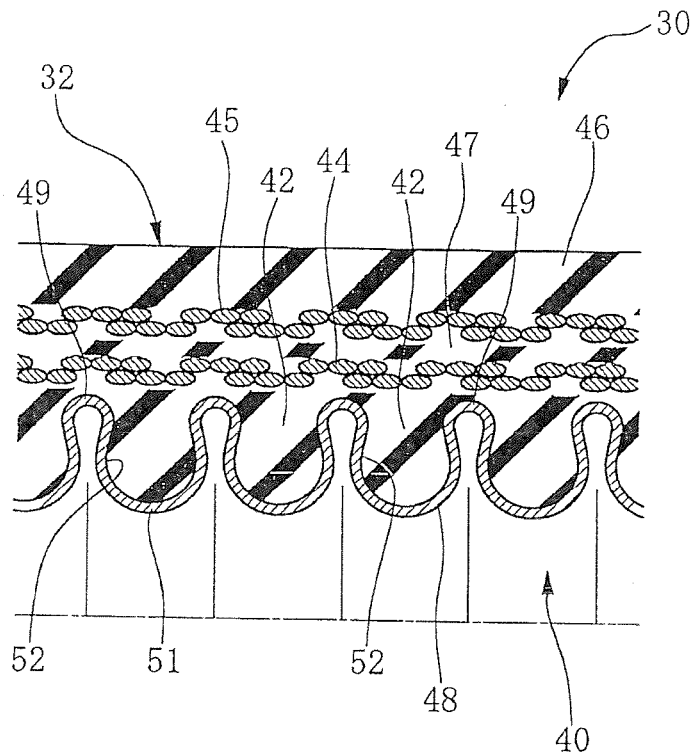
FIG. 10 is an enlarged sectional view of a middle portion of the second composite hose with a corrugated metal tube.

The rubber filler layer 42 (layer made of a solid rubber which is a nonfoamed material) is a layer which penetrates in gaps or valley gaps 52 between adjacent corrugation hills 49, 49 of the corrugated portion 48 on an outer peripheral side thereof as shown in FIG. 10 in order to restrain the corrugation hills 49 from deformation in an expanding manner when an internal pressure is exerted to the corrugated portion 48. The rubber filler layer 42 may be made of EPDM or the like similarly to the inner rubber layer 25.

In this embodiment, the rubber filler layer 42 is filled completely in the valley gaps 52 to tops of the corrugation hills 49. A radial is thickness or a wall thickness of the rubber filler layer 42 measured between the tops of the corrugation hills 49 of the corrugated portion 48 and the reinforcing layer 44 is designed 0.5 mm or less.

Meanwhile, the first and second reinforcing layers 44, 45 are provided to secure pressure resistance. The middle rubber layer 47 between the first and the second reinforcing layers 44, 45 serves to restrain the first and the second reinforcing layers 44, 45 from being displaced, for example, in a longitudinal direction, with respect to one another, and being worn out, and to unify these layers. Further, the outer surface rubber layer 46 as an outermost layer serves to protect the second reinforcing layer 45.

In this embodiment, the corrugated metal tube 40 preferably has a wall thickness of 0.5 mm or less in view of flexibility and elasticity required.

On the other hand, in view of workability or processability of a metal tube, the corrugated metal tube 40 preferably has the wall thickness of 0.1 mm or larger.

And, as for material of the corrugated metal tube 40, iron, iron steel, stainless steel or other alloy steel, aluminum or aluminum alloy, copper or copper alloy, nickel or nickel alloy, titanium or titanium alloy, tin or tin alloy, or the like may be used. The material of the corrugated metal tube 40 may be selected properly from these materials in view of resistance to conveyed fluid, durability against vibration/pressure, workability of a metal tube, or the like. Specifically, stainless steel is preferably used. The same applies to the corrugated metal tube 7.

As for reinforcing wire members or filament members of the first reinforcing layer 44 and the second reinforcing layer 45, usable are reinforcing threads formed from organic fiber such as aramid threads, and as for material or raw material for the reinforcing wire members, usable are various other materials. The same applies to the reinforcing layer 27. According to need, a metal wire may be used.

And, in this embodiment, the elastic filler layer is the rubber filler layer 42. However, according to the circumstances, any elastic materials other than rubber such as thermoplastic elastomer may be also used. The same applies to the inner rubber layer 25.

As shown detailedly in FIG. 11, in this embodiment, the corrugated metal tube 40, specifically the corrugated portion 48 is shaped such that the corrugation hills 49 has a curvature radius $R2_0$ smaller than a curvature radius $R1_0$ of the corrugation valleys 51 before prepressurizing process to be applied later.

Figure 11:
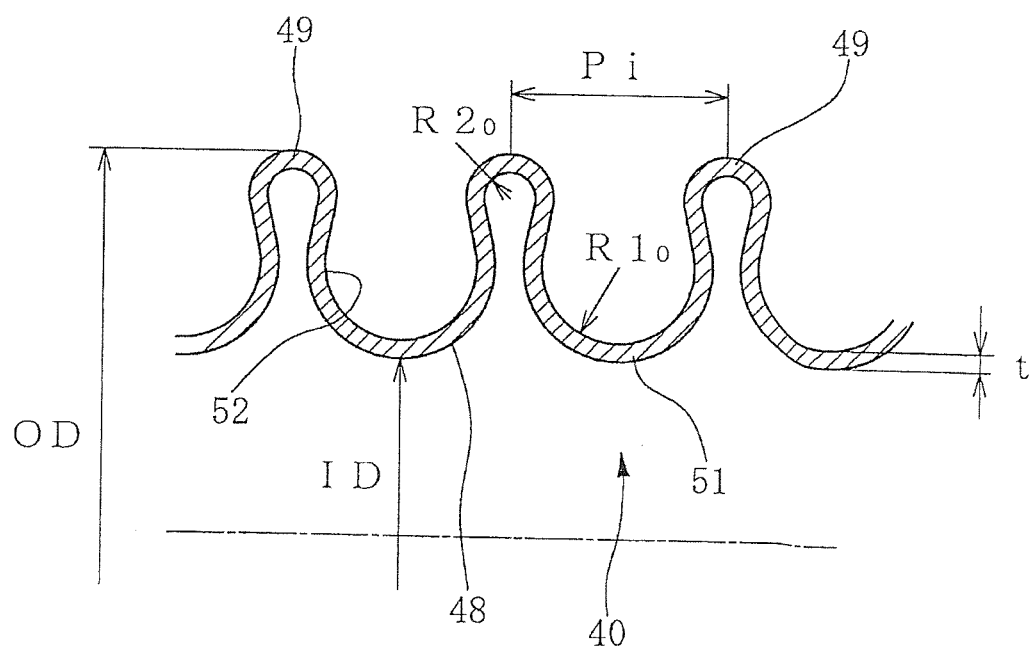
FIG. 11 is an enlarged sectional view of the corrugated metal tube of the second composite hose.

In FIG. 11, OD indicates an outer diameter of the corrugated portion 48, ID indicates an inner diameter thereof, Pi indicates a corrugation pitch thereof, and t indicates a wall-thickness thereof.

Here, the prepressurizing process is applied so that the corrugation hills 49 are deformed in an expanding manner under a pressure higher than an internal pressure to be exerted by conveyed fluid in active use of the second hose 30, specifically such high pressure beyond the yield point as the corrugation hills 49 of the corrugated metal tube 40 are plastically deformed. And, thereby an extruding force is exerted outwardly (radially outwardly) to the rubber filler layer 42 penetrating in the valley gaps 52 to make the first reinforcing layer 44 in a tensioned state preliminarily. Namely, the prepressurizing process is applied to make the first reinforcing layer 44 in the tensioned state by eliminating slackness and looseness which initially occurred in the first reinforcing layer 44. This prepressurizing process allows the second hose 30 to be applied for active use while the first reinforcing layer 44 is maintained in fully tensioned state.

Figure 12:
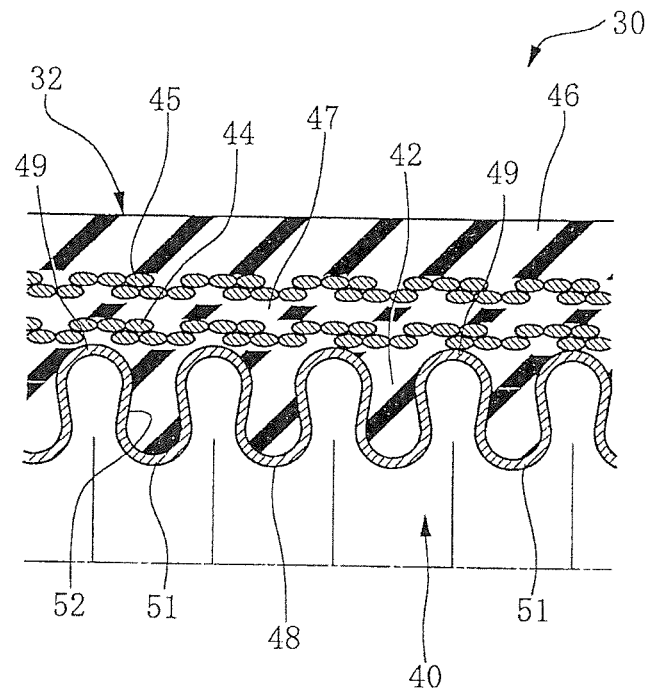
FIG. 12 is an enlarged sectional view of the middle portion of the second composite hose with a corrugated metal tube after prepressurized prior to active use.

When the first reinforcing layer 44 is in fully tensioned state, the corrugation hills 49 is raised toward a side of the first reinforcing layer 44 in hill height as shown in FIG. 12, the rubber filler layer 42 is rejected out of between the corrugation hills 49 and the first reinforcing layer 44, and a part of rejected rubber filler layer 42 intrudes between the corrugation hill 49 and adjacent corrugation hill 49 which are raised in hill height. This is as is the case with the first hose 1.

By applying the prepressurizing process in such manner, once an internal pressure is exerted to the corrugated metal tube 40 in active use of the second hose 30, the internal pressure is transmitted immediately to the first reinforcing layer 44 and the internal pressure is borne by the first reinforcing layer 44. This reinforcing effect provided by the first reinforcing layer 44 restrains the corrugated metal tube 40 from deformation in active use of the second hose 30.

Figure 13:
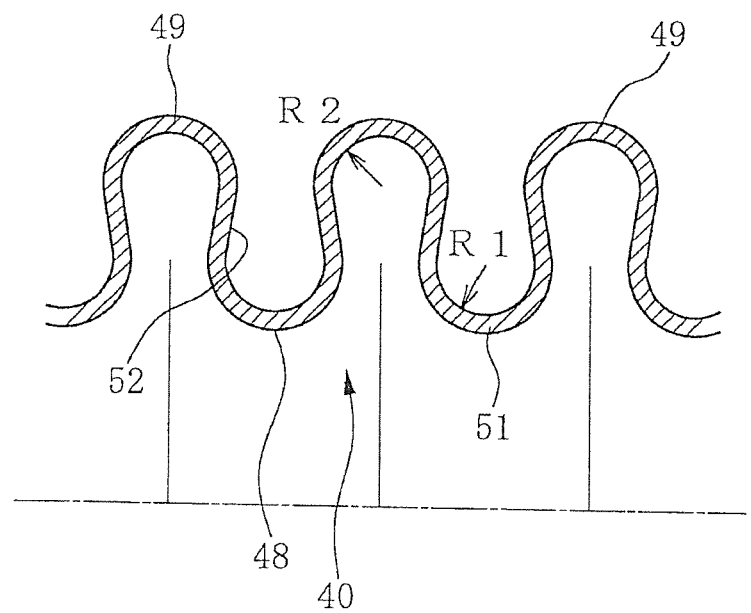
FIG. 13 is an enlarged sectional view of the corrugated metal tube of the second composite hose after prepressurized prior to active use.

In this embodiment, the corrugated metal tube 40 is shaped such that the corrugation hills 49 has the curvature radius $R2_0$ smaller than the curvature radius $R1_0$ of the corrugation valleys 51 before prepressurizing process is applied as stated above. And, as a result, when the prepressurizing process is applied later, the corrugation hills 49 are deformed in a raised manner and thereby the curvature radius $R2$ of the corrugation hills 49 comes close to the curvature radius $R1$ of the corrugation valleys 51 as shown in FIG. 13.

Therefore, according to this embodiment, the corrugation hills 49 takes a shape similar to or near the corrugation valleys 51 by applying the prepressurizing process. So, this may effectively enhance durability against repetition cycles of bending deformation as well as durability against repetition cycles of the internal pressure with regard to the second hose 30. The durability against repeated internal pressures is improved due to the same reason as the first hose 1.

Also, initially the corrugation valleys 51 has the curvature radius $R1_0$ larger than the curvature radius $R2_0$ of the corrugation hills 49. This enhances easy penetration of the rubber filler layer 42 in the valley gaps 52 at production of the second hose 30, and thereby product quality is more improved and stabilized.

In this embodiment, the curvature radius $R2_0$ of the corrugation hills 49 is preferably designed equal to or less than two-thirds of the curvature radius $R1_0$ of the corrugation valleys 51, or more preferably, equal to or less than one-third thereof.

This design allows the corrugation hills 49 to have the curvature radius R2 closer or nearer to the curvature radius R1 of the corrugation valleys 51 when applied such high pressure as to plastically deform the corrugation hills 49 of the corrugated metal tube 40 in the later prepressurizing process.

Next, a sample 1 with regard to the second hose 30 are constructed (produced) in such manner as follows. The corrugated metal tube 40 is first formed from SUS304 material. Here, the corrugated metal tube 40 is shaped with or dimensioned an outer diameter OD 9.7 mm, an inner diameter ID 4.5 mm, a wall thickness t 0.23 mm and a corrugation pitch Pi 2.0 mm (first step).

The corrugation hills 49 and corrugation valleys 51 have the same curvature radius of 0.5 mm initially before the prepressurizing process is applied.

And, rubber material (EPDM is used) is laminated on the outer periphery of the corrugated metal tube 40 by extrusion to form the rubber filler layer 42. Then the first and second reinforcing layers 44, 45 are formed by braiding reinforcing yarns of aramid threads therearound with interposing the middle rubber layer 47 between the first and second reinforcing layers 44, 45.

Here, the reinforcing layers 44, 45 are designed to have pressure resistance of about 80 MPa.

Then, the outer rubber layer 46 is laminated or overlaid on the second reinforcing layer 45 by extrusion.

A product is treated by vulcanizing under the condition of 150° C. for 30 minutes to form the hose body 32.

After that, the metal joint fittings 34 are attached to opposite end portions of the hose body 32. The metal joint fittings 34 is mounted and assembled on the hose body 32 so as to have pressure resistance beyond 80 MPa (second step).

Then, in the same prepressurizing mode as the first hose 1, an internal pressure exerted to an assembled product at a determined pressure raising speed of 10 MPa/minutes up to a determined pressure of 60 MPa, and then the internal pressure is reduced slowly or gradually (third step).

Before the prepressurizing process, in the corrugated portion 48, the curvature radius R of the corrugation hills to the curvature radius R of the corrugation valleys is 0.5 mm to 0.5 mm, namely 1:1. After the prepressurizing process at the determined pressure of 60 MPa, the curvature radius R of the corrugation hills to the curvature radius R of the corrugation valleys is 0.75 mm to 0.25 mm, namely 3:1. That is, the curvature radius R of the corrugation hills becomes larger while the curvature radius R of the corrugation valleys becomes smaller.

A sample 2 of the second hose 30 is produced in generally same manner as above.

However, in the corrugated portion 48 of the sample 2, the curvature radius R of the corrugation hills and the curvature radius R of the corrugation valleys are 0.4 mm and 0.6 mm at an initial stage before the prepressurizing process respectively. In the sample 2 after the prepressurizing process, the curvature radius R of the corrugation hills to the curvature radius R of the corrugation valleys becomes 0.6 mm to 0.4 mm, namely 3:2. The curvature radius R of the corrugation hills becomes slightly larger than the curvature radius R of the corrugation valleys.

A sample 3 of the second hose 30 is produced in generally same manner as above.

However, in the corrugated portion 48 of the sample 3, the curvature radius R of the corrugation hills and the curvature radius R of the corrugation valleys are 0.25 mm and 0.75 mm at the initial stage before the prepressurizing process respectively. In the sample 3, after the prepressurizing process, the curvature radius R of the corrugation hills to the curvature radius R of the corrugation valleys becomes 0.5 mm to 0.5 mm, namely 1:1. Namely, the curvature radius R of the corrugation hills becomes the same or generally the same as the curvature radius R of the corrugation valleys.

Figure 14:
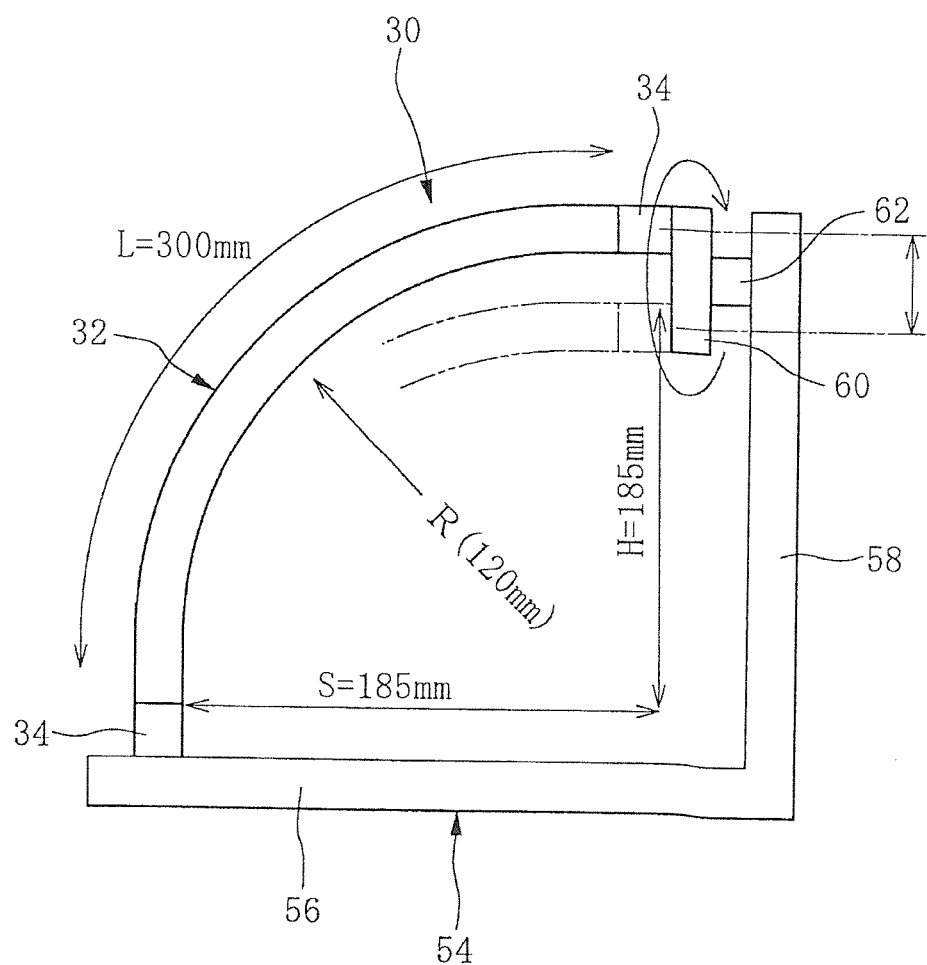
FIG. 14 is a view to explain a method of a durability test.

In order to evaluate durability, complex test equipment with bending-vibration function as shown in FIG. 14 is used in view of vibration resistance of a hose which is assembled in a motor vehicle.

In FIG. 14, reference numeral 54 indicates a mounting table. The mounting table 54 is provided with a horizontal portion 56 and a vertical portion 58 which are perpendicular to one another.

A rotating disk 60 is provided on a rotation shaft 62 rotatably at an upper end portion of the vertical portion 58.

Here, all samples with respect to the second hose 30 have free length L=300 mm except the metal joint fittings 34, 34. Each sample is bent with a bend radius R=120 mm. In each sample, the metal joint fitting 34 on one end of the sample is securely fixed non-rotatably at a cross angle of 90° to the horizontal portion 56 of the mounting table 54, while the metal joint fitting 34 on the other end of the sample is securely fixed at a cross angle 90° with respect to the rotating disk 60 at an eccentric position on an outer peripheral portion of the rotating disk 60 (however, the metal joint fitting 34 is rotatable relatively with respect to the rotating disk 60). Then by rotating the rotating disk 60 at 450 revolutions per minute, vibration is applied to an end portion of each sample with respect to the second hose 30 at an amplitude of +/−15 mm (total 30 mm) in a horizontal direction and a vertical direction.

This vibration test is conducted to the samples with respect to the second hose 30 to which an internal pressure of 10 MPa is exerted, and durability is evaluated according to occurrence of crack in the corrugated metal tube 40. More specifically, a crack is presumed to occur in the corrugated metal tube 40 at a time when an internal pressure is found reduced, and thereby the durability is judged. The time period until the internal pressure is reduced is regarded as a durable time period.

By way of final confirmation, each sample of the second hose 30 is disassembled and it is confirmed visually whether there occurs a crack in the corrugated metal tube 40.

In a motor vehicle application, a durable time period of 37 hours (a length of time that the rotating disk 60 rotates one million revolutions) or more is required. And a stress of the corrugated metal tube 40 decreases over time under load of vibration, and reaches a saturation point in 370 hours (a length of time that the rotating disk 60 rotates ten-milliOn revolutions). The samples are evaluated in such point of view. A circle is given for the duration time period of 37 hours or more, while a double circle is given for the duration time period of 370 hours or more.

The results are shown in Table 1.

TABLE 1

|  | Durable time period (Hr) (n = 3) | | | Results of disassembled samples | Evaluation |
| --- | --- | --- | --- | --- | --- |
| Sample 1 | 123 | 215 | 186 | Crack is found in corrugation valleys when disassembled in each test. | ◯ |

TABLE 1-continued

| | Durable time period (Hr) (n = 3) | | | Results of disassembled samples | Evaluation |
|---|---|---|---|---|---|
| Sample 2 | 236 | 317 | 288 | Crack is found in corrugation valleys when disassembled in each test. | ○ |
| Sample 3 | 400 or more | 400 or more | 400 or more | No crack is found when disassembled after 400 hours. | ◎ |

As shown in the results in Table 1, all samples with respect to the second hose 30 have the durability of 37 hours or more. The samples 2 and 3 have highly improved durability compared to the sample 1 where the corrugation hills have the same shape as the corrugation valleys before prepressurizing process. In particular, in the sample 3, the durability is dramatically improved and there is found no crack in the corrugated metal tube 40 thereof even after 400 hours. The sample 3 has the durability of 370 hours or more. Therefore, the sample 3 may be judged to have almost permanent durability.

With regard to the durable time period in Table 1, three values are indicated for each sample. This means the test is conducted three times per sample and three results are obtained respectively.

While the present invention has been described in terms of preferred embodiments, it is to be understood that these are presented only for the purpose of illustration. The present invention can be embodied by a variety of modifications without departing from the scope of the invention. For example, the present invention may be adapted for composite hoses other than described above.

By the way, the corrugation hills 21, 49 of the corrugated portion 3, 48 are formed into ridges, and thereby are easily to be deformed radially outward. So, when an internal pressure is exerted to the corrugated metal tube 7, 40, the corrugation hills 21, 49 are expanded radially outward and plastically deformed. On the other hand, the corrugation valleys 23, 51 of the corrugated portion 3, 48 are formed into grooves, and thereby are difficult to be deformed radially outward. Particularly in a pressurizing method as employed here, namely, in the pressurizing method wherein the pressure is increasingly exerted in an inside of the corrugated metal tube 7, 40 at a constant pressure raising speed until the pressure reaches a determined pressure, then the inside of the corrugated metal tube 7, 40 is maintained at the determined pressure during a determined duration time period, plastic deformation is clearly caused in the corrugation hills 21, 49, or in tops (top portions) of the corrugation hills 21, 49, but not caused so much or hardly caused in bottoms (bottom portions) of the corrugation valleys 23, 51, or not caused in the bottoms of the corrugation valleys 23, 51 so much as in the tops of the corrugation hills 21, 49. Namely, Vickers hardness is improved in the corrugation hills 21, 49 or in the tops of the corrugation hills 21, 49, while Vickers hardness is not so much improved in the corrugation valleys 23, 51 or in the bottoms of the corrugation valleys 23, 51. In the paragraph [0051], with respect to the corrugation hills 21 it is described that the tops of the corrugation hills 21 are slightly raised radially outward, and that the corrugation hills 21 are expanded in a widthwise direction thereof, while with is respect to the corrugation valleys 23 it is only described that the corrugation valleys 23 are narrowed in width thereof (refer to FIG. 4). From this, it is understood that plastic deformation is not caused (Vickers hardness is not increased) in the bottoms of the corrugation valleys 23 so much as in the tops of the corrugation hills 21. Further, in the paragraphs [0071] and [0073], with regard to the corrugation hills 49, raised hill height and change of the curvature radius of the corrugation hills 49 are referred to, while with regard to the corrugation valleys 51 only change of the curvature radius thereof is referred to (refer to FIG. 13). Therefore, from this, it is understood that plastic deformation is not caused (Vickers hardness is not increased) in the bottoms of the corrugation valleys 51 so much as in the tops of the corrugation hills 49. In the corrugated metal tube 7, 40 where plastic deformation is not so much caused in the bottoms of the corrugation valleys 23, 51, namely Vickers hardness is not so much increased in the bottoms of the corrugation valleys 23, 51, flexibility is not adversely affected significantly even when the corrugation hills 21, 49 are plastically deformed for enhanced durability.

For example, in the corrugated metal tube 7 made of SUS304 as used in this embodiment, Vickers hardness of the tops of the corrugation hills 21 is about Hv150 after a bright-anneal process. However, in the composite hose 1 constructed in such a manner that a pressure is increasingly exerted in an inside of the corrugated metal tube 7 at a constant pressure raising speed (for example, 10 Mpa/minute) until the pressure reaches 40 Mpa (a determined pressure) and the inside of the corrugated metal tube 7 is maintained at 40 Mpa during a determined duration time period (for example, for five minutes), Vickers hardness of the tops of the corrugation hills 21 is improved to Hv170. For example, when the determined pressure is increased, the Vickers hardness of the tops of the corrugation hills 21 becomes greater than Hv170. On the contrary, Vickers hardness of the corrugation valleys 23 remains about Hv150, or less than Hv170. Therefore, generally speaking, a corrugated metal tube that is made of SUS304 and has Vickers hardness equal to or greater than Hv170 at tops of corrugation hills may have sufficient pressure resistance and flexibility. And, a composite hose wherein Vickers hardness of corrugation hills or of tops of the corrugation hills is greater than Vickers hardness of corrugation valleys or of bottoms of the corrugation valleys by 5% or more, or 10% or more also may have sufficient pressure resistance and flexibility.

As explained above, the composite hose according to the present invention or the composite hose which is made by production method according to the present invention may be adapted for piping, for example, fuel piping in a motor vehicle with excellent durability.

The invention claimed is:
1. A method for making a composite hose, comprising:
 a first step of preparing a corrugated metal tube including a corrugated portion formed with corrugation hills and corrugation valleys,
 a second step of constructing an outer peripheral portion with flexibility on an outer periphery of the corrugated metal tube by forming an elastic layer on an outer periphery of the corrugated metal tube and providing a reinforcing layer on an outer periphery of the elastic layer, and
 a third step of plastically deforming the corrugated metal tube outwardly by exerting a deforming pressure beyond a yield point of the corrugated metal tube in an inside of the corrugated metal tube provided with the outer peripheral portion on an outer periphery thereof until the corrugation hills plastically deform;
 wherein the deforming pressure is applied so that the corrugation hills have Vickers hardness that is greater than Vickers hardness of the corrugation valleys.

2. The method as set forth in claim 1, wherein the deforming pressure is applied so that the corrugation hills have the Vickers hardness that is greater than the Vickers hardness of the corrugation valleys by 5% or more.

3. A method for making a composite hose, comprising:
a first step of preparing a corrugated metal tube including a corrugated portion formed with corrugation hills and corrugation valleys,
a second step of constructing an outer peripheral portion with flexibility on an outer periphery of the corrugated metal tube by forming an elastic layer on an outer periphery of the corrugated metal tube and providing a reinforcing layer on an outer periphery of the elastic layer, and
a third step of plastically deforming the corrugated metal tube outwardly by exerting a deforming pressure beyond a yield point of the corrugated metal tube in an inside of the corrugated metal tube provided with the outer peripheral portion on an outer periphery thereof until the corrugation hills plastically deform;
wherein the corrugated metal tube is made of SUS304, and the deforming pressure is applied so that the corrugated metal tube has Vickers hardness that is equal to or greater than Hv170 at positions of the tops of the corrugation hills.

4. A method for making a composite hose, the method comprising the steps of:
providing an elongated, fluid impermeable, corrugated metal tube having corrugation hills and corrugation valleys;
providing a flexible elastic layer in the corrugation valleys on an outer periphery of the corrugated metal tube; and a reinforcing layer on an outer periphery of the elastic layer, the reinforcing layer being spaced from the corrugation hills by a distance that is greater than 0.27 mm; and
applying pressure to an interior of the corrugated metal tube, the pressure being greater than a radial yield point of the corrugated metal tube, until the corrugation hills plastically deform and the corrugated metal tube is deformed outwardly towards the reinforcing layer and the distance between the reinforcing layer and tops of the corrugation hills becomes equal to or less than 0.27 mm,
wherein the pressure is raised in an inside of the corrugated metal tube by maintaining a constant pressure raising speed or rate increasing up to a determined pressure, the determined pressure is greater than the yield point of the corrugated metal tube, and the inside of the corrugated metal tube is maintained at the determined pressure during a determined duration time period to plastically deform the corrugated metal tube.

5. A method for making a composite hose, the method comprising the steps of:
providing an elongated, fluid impermeable, corrugated metal tube having corrugation hills and corrugation valleys;
providing a flexible elastic layer in the corrugation valleys on the outer periphery of the corrugated metal tube; and
applying pressure to the interior of the corrugated metal tube, the pressure being greater than a radial yield point of the corrugated metal tube, until the corrugation hills plastically deform and comprise a width that is greater than a width of the corrugation valleys,
wherein the pressure is raised in an inside of the corrugated metal tube by maintaining a constant pressure raising speed or rate increasing up to a determined pressure, the determined pressure is greater than the yield point of the corrugated metal tube, and the inside of the corrugated metal tube is maintained at the determined pressure during a determined duration time period to plastically deform the corrugated metal tube.

6. A method for making a composite hose, the method comprising the steps of:
providing an elongated, fluid impermeable, corrugated metal tube having corrugation hills and corrugation valleys;
providing a flexible elastic layer in the corrugation valleys on the outer periphery of the corrugated metal tube; and
applying pressure to the interior of the corrugated metal tube, the pressure being greater than a radial yield point of the corrugated metal tube, until the corrugation hills plastically deform and the corrugation hills comprising a radius of curvature that is smaller than a radius of curvature of the corrugation valleys before the pressure is applied,
wherein the pressure is raised in an inside of the corrugated metal tube by maintaining a constant pressure raising speed or rate increasing up to a determined pressure, the determined pressure is greater than the yield point of the corrugated metal tube, and the inside of the corrugated metal tube is maintained at the determined pressure during a determined duration time period to plastically deform the corrugated metal tube.

7. A method for making a composite hose, the method comprising the steps of:
providing an elongated, fluid impermeable, corrugated metal tube having corrugation hills and corrugation valleys;
providing a flexible elastic layer in the corrugation valleys on the outer periphery of the corrugated metal tube; and
applying pressure to the interior of the corrugated metal tube, the pressure being greater than a radial yield point of the corrugated metal tube, until the corrugation hills plastically deform and comprise a width that is generally equal to the width of the corrugation valleys,
wherein the pressure is raised in an inside of the corrugated metal tube by maintaining a constant pressure raising speed or rate increasing up to a determined pressure, the determined pressure is greater than the yield point of the corrugated metal tube, and the inside of the corrugated metal tube is maintained at the determined pressure during a determined duration time period to plastically deform the corrugated metal tube.

* * * * *